United States Patent [19]

Monticelli et al.

[11] Patent Number: 4,459,699
[45] Date of Patent: Jul. 10, 1984

[54] DIFFERENTIAL SAMPLE AND HOLD COUPLING CIRCUIT

[75] Inventors: Dennis M. Monticelli, Fremont; Michael E. Wright, Mountain View; Robert S. Sleeth, Santa Clara, all of Calif.

[73] Assignee: National Semiconductor Corporation, Santa Clara, Calif.

[21] Appl. No.: 307,705

[22] Filed: Oct. 2, 1981

[51] Int. Cl.³ .................................................. H04L 25/06
[52] U.S. Cl. ........................................ 375/76; 328/162; 328/163; 375/94
[58] Field of Search .................. 307/352, 491, 494; 328/149, 151, 162, 163, 165, 175; 375/76, 94; 358/171, 173; 329/110; 330/11, 290, 291, 149

[56] References Cited

U.S. PATENT DOCUMENTS

| | | | |
|---|---|---|---|
| 3,473,131 | 10/1969 | Perkins, Jr. | 328/163 |
| 4,029,904 | 6/1977 | Papeschi | 375/76 |
| 4,161,628 | 7/1979 | McRae | 328/162 |

*Primary Examiner*—Benedict V. Safourek
*Attorney, Agent, or Firm*—Gail W. Woodward; Paul J. Winters; Michael J. Pollock

[57] ABSTRACT

A carrier current receiver employs a comparator driven differentially to square a received data signal. The same drive signal is applied to a sample and hold circuit in which a capacitor is charged to a level that is related to the data signal offset. A voltage-to-current converter responds to the capacitor charge and feeds a current to the input where it acts to correct the offset.

4 Claims, 4 Drawing Figures

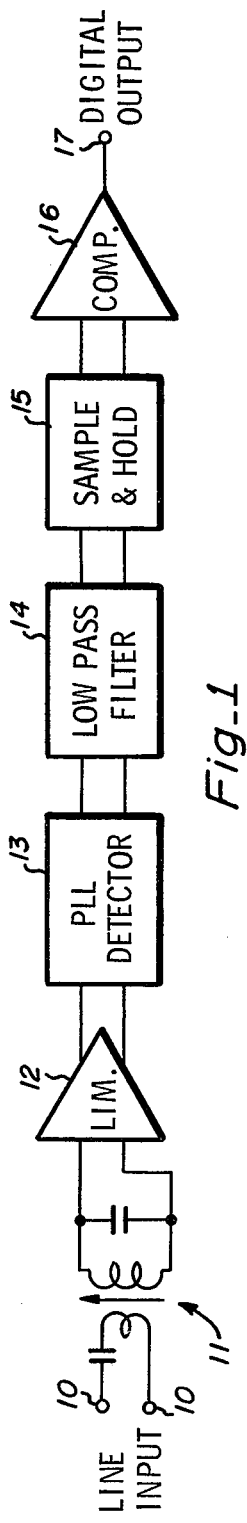
Fig_1
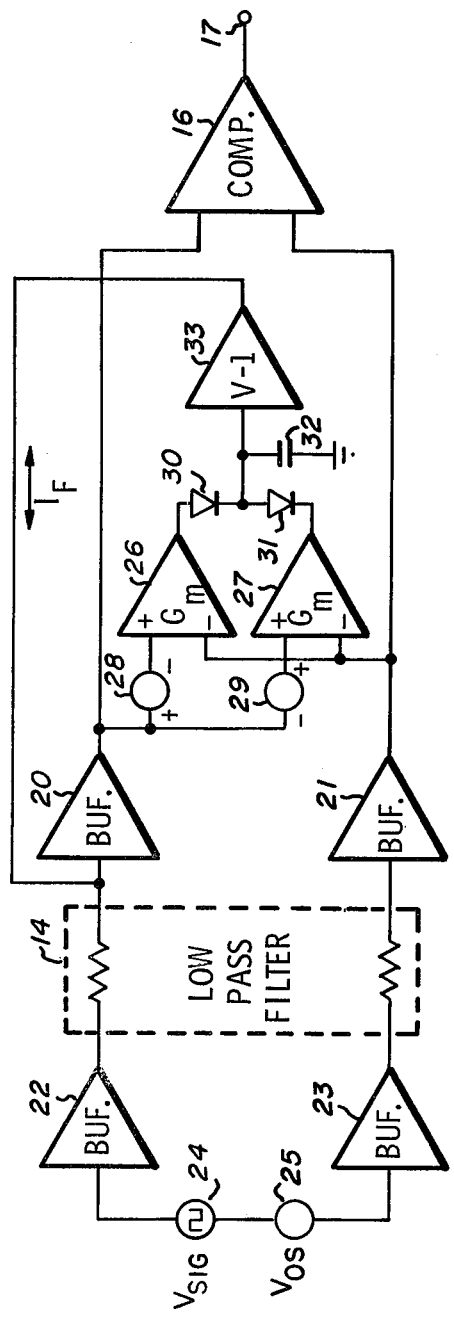
Fig_2

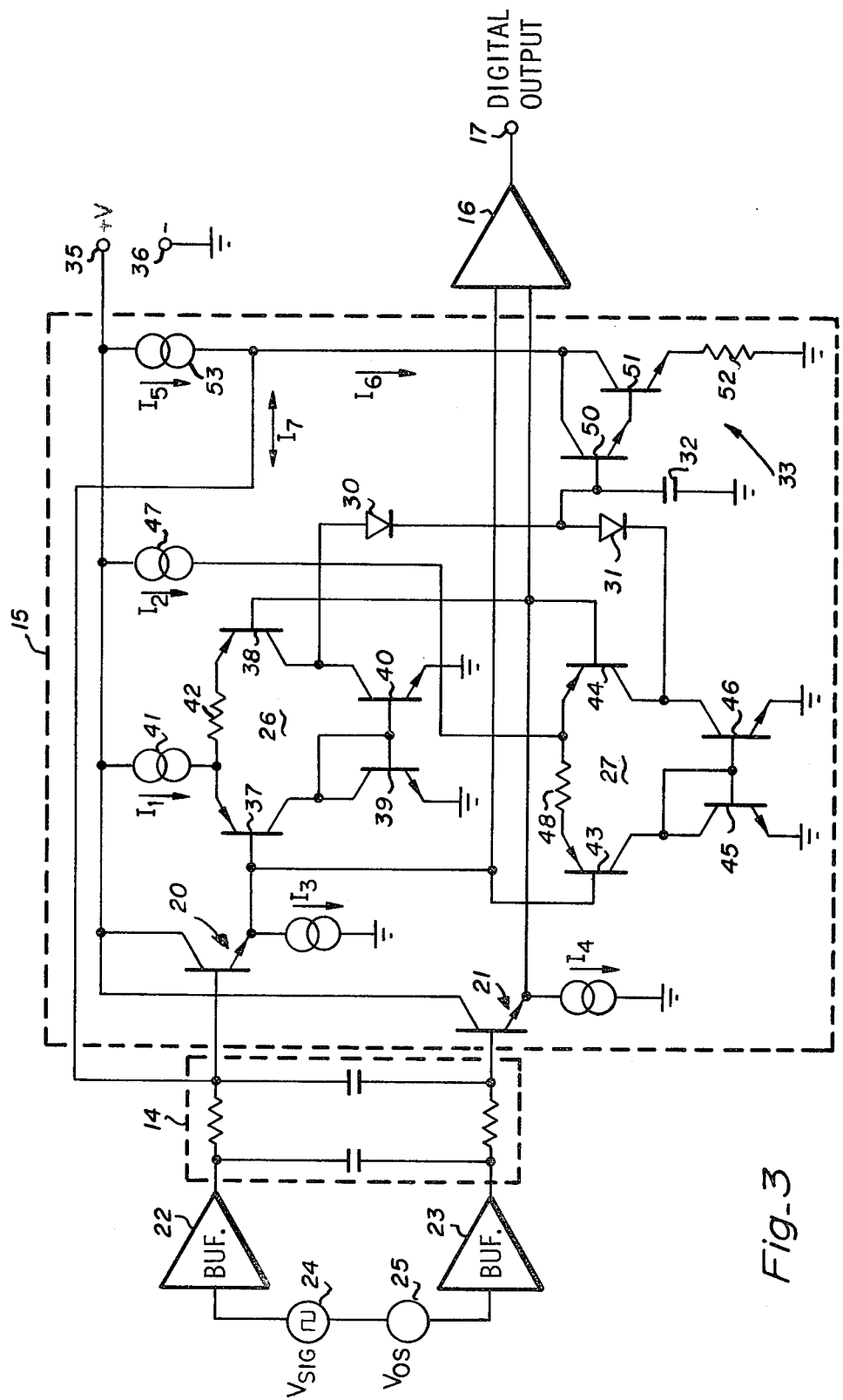
Fig._3

DIFFERENTIAL SAMPLE AND HOLD COUPLING CIRCUIT

BACKGROUND OF THE INVENTION

The invention relates generally to modems in which serial data modulates a carrier which in turn is transmitted over lines, such as telephone lines, to a receiver where the data are reproduced. In particular, the invention relates to carrier current data transmission systems in which modems utilize AC power lines for the transmission of the carrier. Carrier current receivers in association with carrier current transmitters often comprise a complex system consisting of numerous uniquely addressable remote receivers or transceivers in communication with and under the control of a master unit. Such systems commonly employ FM transmission to alleviate problems associated with power line noise.

In any such system in which a digitally modulated carrier must be demodulated, a comparator is employed to "slice" the demodulated baseband data into clean digital ones and zeroes. The success of the comparator is crucial to the optimum performance of the system and is in turn dependent upon the level of its threshold relative to the level of the demodulated signal. If the threshold is set midway between the peak-to-peak excursions of the signal, the comparator will perform best. Any deviation from the above condition is considered less than optimum and will result in reduced noise immunity and/or data pulse width distortion. Noise and/or harmonic reduction filters are often placed ahead of the comparator and they may contribute to the potential pulse width distortion due to their "rounding" effect on the data pulses.

Many schemes have been used to center the comparator threshold relative to the incoming signal, which is often itself contaminated with unpredictable DC offsets. An example would exist in the case of a PLL receiver in which the difference between the center frequency of the transmitter and the center frequency of the receiver VCO B08200210/km/rg manifests as DC offset at the receiver demodulator output. One way is to directly couple the signal to one of the comparator inputs and couple the capacitively derived average of the signal to the other input. The comparator threshold is thus the average of the signal irrespective of the signal amplitude. Unfortunately, if the data stream has a duty cycle other than 50%, then the average value will not be midway between the peak-to-peak excursions of the signal. Also, a relatively large capacitor must be used to effectively average the long strings of ones and zeroes. Such a capacitor cannot be quickly charged and discharged as is necessary for frequent transmit/receive exchanges. An alternative approach involves using a DC feedback loop to force the comparator threshold midway relative to the signal. But once again, the error storage capacitor for the loop will respond to the average of the signal resulting in an erroneous threshold value for non-50% data streams. Some systems have used peak detection schemes that attempt to accurately peak detect a small amplitude and noisy demodulated signal which often sits on top of a large and varying common mode DC voltage. Obvious problems result from the peak detector's tendency to detect noise and its inability to accurately hold the peak value. Due to the relatively large common mode voltage, this value is often several volts-meaning that the holding capacitor droop is a large percentage of the much smaller signal value. Large capacitors are needed to reduce droop and adversely affect transmit/receive switchover time.

SUMMARY OF THE INVENTION

It is an object of the invention to provide a data transmission system in which a DC signal is produced to provide accurate decoding of a data signal.

It is a further object of the invention to provide a data transmission receiver with a sample and hold capability that accurately produces switching at the center of the data signal.

It is a still further object of the invention to provide an integrated circuit operating in differential fashion to develop a DC signal in a sample and hold mode to accurately represent the center of a differential data signal.

These and other objects are obtained in a circuit configured as follows. A pair of differential transconductance amplifiers are provided with controlled oppositely polarized offset potentials. This creates a signal "window" which is designed to exactly accommodate the amplitude of the data signal being received. The amplifier outputs are arranged to respectively charage and discharge a capacitor when the data signal peaks exceed the offset potentials. The capacitor charge is converted to a current that is fed back to the input circuit where it develops a canceling offset. Thus, when there is an offset present at the input a current is fed back to the input that cancels the offset. This means that the data signal is forced to fit the window created at the input. Then when the data signal is fed differentially to a comparator, the signal midpoint will be the switching level independent of input offsets and the duty cycle.

BRIEF DESCRIPTION OF THE DRAWING

FIG. 1 is a block diagram of a carrier current receiver;

FIG. 2 is a block diagram of a sample and hold circuit;

FIG. 3 is a schematic diagram of an integrated circuit sample and hold circuit.

DESCRIPTION OF THE INVENTION

Figure 4:
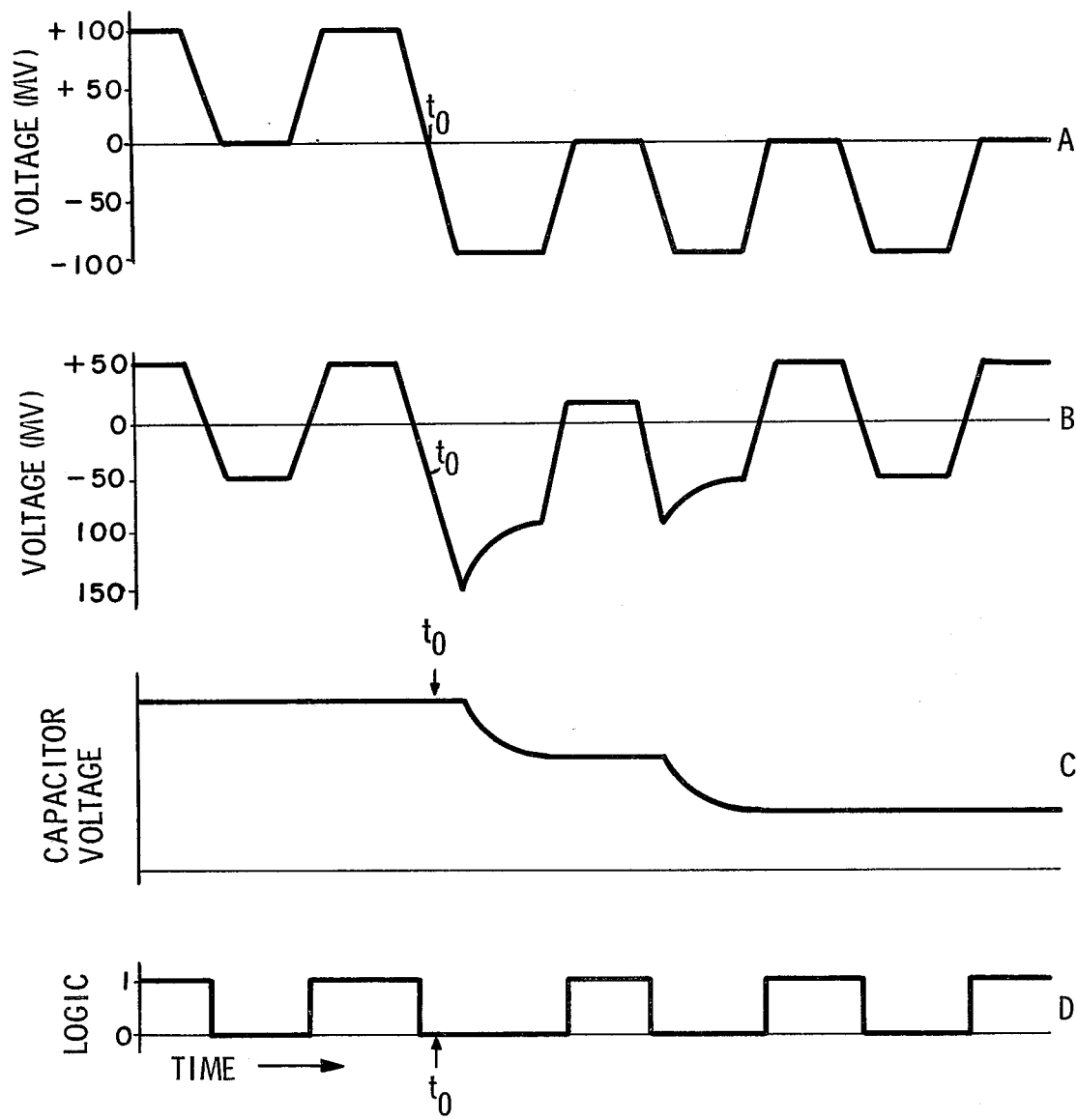
FIG. 4 is a graph of the waveforms in the circuit of FIG. 3.

FIG. 1 is a block diagram of a carrier current receiver having a digital output. Input terminals 10 are coupled to an AC power line which is carrying the carrier current signals which are typically at a frequency of about one hundred kHz. A tuned coupling circuit 11 passes the carrier current signal to a limiter amplifier 12 which drives detector 13. Typically the detector 13 circuitry involves a phase locked loop (PLL) oscillator in a synchronous detector that employs a typical balanced demodulator that develops data signal. Detector 13 is coupled to a filter 14 which operates as a low pass device that reduces the data signal harmonic content of the detected signals. In other words, filter 14 has substantial attenuation of the second and higher order harmonics of the data signal frequency. The output of filter 14 is coupled through a sample and hold circuit 15 to a comparator 16 the output of which appears as a digital signal at terminal 17.

Since the system operates on carrier current signals that represent digital information, the output of detector 13 will be a pulse stream that represents the carrier frequency envelope. Filter 14, which is an essential element in determining the receiver noise immunity, acts to round off the square edges and impart a trapezoidal shape to them. While this action reduces noise signals, it makes comparator switching a problem. Since the signal coupled to the comparator is a ramp function, it is important that the comparator reference for switching be located at the exact center of the waveform.

The circuit of the invention, shown in FIG. 2 in detailed block diagram form, will operate to avoid the problem commonly associated with the prior art approach. In essence a signal window is created having a size equal to the peak-to-peak data signal level. When the data signal positive peak exceeds the upper window level, a current is fed back to the input to lower it by the desired amount. When the data signal negative peak exceeds the lower window level, an opposite current is coupled back to the input to raise it by the desired amount. So long as the signal fits within the window, no current is fed back and the circuit operates without any offset level correction.

Referring in detail to FIG. 2, the output of filter 14 is coupled via buffers 20 and 21 to the two inputs of comparator 16. Filter 14 has its inputs isolated by buffers 22 and 23 which are shown being differentially driven by a data signal source 24 and an offset signal source 25. The signal source 24 is a data pulse stream developed in detector 13 while source 25 is a variable DC signal that can represent any incidental offset. For example, it can be due to small difference between transmitter and receiver frequency (this effected is compounded when many transmit/receive pairs are involved in a system), PLL offsets, and drifts in DC level that occur while the equipment operates.

A pair of transconductance amplifiers 26 and 27 are driven differentially by buffers 20 and 21. Each of amplifiers 26 and 27 has a DC offset shown in the noninverting inputs and these are oppositely poled as shown. The inverting inputs are directly coupled to buffer 21. Offset sources 28 and 29 act with amplifiers 26 and 27 respectively to create a signal window.

When the most positive excursion of signal source 24 exceeds the upper window limit, amplifier 26 turns diode 30 on to charge capacitor 32. This increase in charge is converted by voltage-to-current converter 33 to force a current to flow from left to right in filter 14 so that the DC drop developed in its internal resistance will oppose the offset at 25. Capacitor 32 will charge until the feedback current develops a voltage drop to exactly cancel $V_{OS}$. If the polarity of $V_{OS}$ is reversed, the bottom edge of the signal from source 24 will hit the bottom of the window, thereby turning diode 31 on via amplifier 27. This action will discharge capacitor 32 and voltage-to-current converter 33 will reverse the current flowing in the resistance of filter 14 so that the voltage drop therein will oppose $V_{OS}$. When $V_{OS}$ goes to zero, the charge on capacitor 32 will be set to a level where the current from converter 33 is zero. Under this condition, the signal developed at 24 will just fit into the window as an AC differential data signal.

FIG. 3 is an IC schematic that is designed to accomplish the functions of FIG. 2. Where the parts have an equivalence the same numbers are used. A 10-Volt supply is coupled between terminal 33 and ground terminal 36 to operate the circuit.

Transconductance amplifier 26 is composed of differentially driven transistors 37 and 38 working into the current mirror load comprised of transistors 39 and 40. Tail current $I_1$ is supplied by source 41. Resistor 42 is present in the emitter of transistor 38 to create an unbalance which shows up as an offset potential at the input of amplifier 26 (element 28 of FIG. 2). When the bases of transistors 37 and 38 are driven so that $I_1/2$ flows in each transistor, it can be seen that the base of transistor 38 must be less positive (more negative) than the base of transistor 37 by the amount of the voltage drop across resistor 42. By way of example, if resistor 42 is 2K Ohms and source 41 passes 50 microamperes, the differential offset voltage will be 50 millivolts.

Transconductance amplifier 27 is composed of differentially driven transistors 43 and 44 working into current mirror load transistors 45 and 46. Current source 47 passes $I_2$ as tail current and resistor 48 in the emitter of transistor 43 introduces an input offset potential. Since resistor 48 is on the opposite side with respect to resistor 42, the offset polarity will be opposite in amplifier 27 relative to 26. (See the polarity of 28 and 29 of FIG. 2.) It can be seen that for balanced conduction in transistors 43 and 44 the base of transistor 43 must be more negative than the base of transistor 44. If source 47 matches source 41 and resistors 48 and 42 are of equal value, the offsets will be equal and opposite. Using the above example of 50 millivolts, the combination of amplifiers 26 and 27 will have an offset differential of 100 millivolts ($\pm 50$ mV) thereby to create a 100-millivolt signal window. When the base of transistor 37 is driven in excess of 50 mV above the base of transistor 38, diode 30 will conduct. When the base of transistor 43 is driven more than 50 mV below the base of transistor 44, diode 31 will conduct. Thus the charge on capacitor 32 will be varied as a function of input drive outside the window. Positive going overdrive will charge capacitor 32 and negative going overdrive will discharge it.

The voltage across capacitor 32 determines the conduction in Darlington connected transistors 50 and 51, which act as a voltage-to-current converter 33. Resistor 52 is made to have substantially the same value as the load resistance to be supplied, which in this case is the series resistance of one side of filter 14. Current source 53 passes $I_5$ into the collector of transistor 51. If $I_6$, the Darlington collector current, and $I_5$ are equal, there will be zero $I_7$ feedback current. Assuming an $I_5$ of 5 microamperes and the value of resistor 52 at 300K ohms, the potential at the emitter of transistor 51 will be 1.5 volts. To achieve this state, the charge on capacitor 32 will be close to 2.7 volts (2 $V_{BE}$ above the emitter of transistor 51).

If capacitor 32 is charged above 2.7 volts, $I_6$ will exceed $I_5$ and $I_7$ will flow from left to right. This will produce a negative offset fed back to the input of buffer 20. Its value will exactly equal the $V_{OS}$ of 25.

If capacitor 32 is charged to a level that is below 2.7 volts (discharged by diode 31), $I_6$ will be less than $I_5$ so that $I_7$ flows from right to left. This will produce a positive offset fed back to the input of buffer 20. Again, the feedback will be equal and opposite to $V_{OS}$ at 25.

From the above, it can be seen that the circuit has an input window that is of the same size as the peak-to-peak input signal and the input signal is adjusted, by virtue of the feedback loop, to cancel the effect of input offsets.

FIG. 4 is a set of graphs showing circuit operation. A two transmitter condition is chosen in which each has a large offset equal to peak amplitude. At $t_0$ the first transmitter is turned off and the second transmitter is turned on. It is to be understood that while FIG. 4 shows alternating ones and zeros in the data stream, this is an unusual condition used only for the purpose of illustration. Curve A is the uncorrected output of filter 14; this would be the signal with the feedback inoperative. Prior to $t_o$, there is a $+50$ mV offset and after $t_o$ there is a $-50$ mV offset. The offset shift between transmitters is 100 mV and could be due to a center frequency error.

Curve B is the differential output of filter 14 with the circuit operative. It can be seen that prior to $t_o$ the $+50$ mV shift has been accommodated. After $t_o$, the $-50$ mV shift is accommodated over two cycles.

Curve C shows the shift in capacitor voltage over the two cycles needed for the correction action. As a pracitcal matter, if amplifiers 26 and 27 are made to conduct more heavily and/or capacitor 32 is made small enough, the offset correction can occur in a single cycle. It is only necessary that capacitor 32 be made large enough that circuit leakage will not appreciably discharge it during long strings of ones and zeros.

Curve D shows the output of comparator 16 at terminal 17. It will be noted that there is a pulse width perturbation of the comparator output in correcting for the 100 mV transmitter offset shift at $t_o$. The effect would not be seen in a typical data system because valid data is only assumed after a preamble of several transmission cycles is completed.

As shown above, the window created by the offsets in amplifiers 26 and 27 must be of the same size as the signal of source 24. FIG. 1 shows the circuit being driven from a PLL detector 13 which in IC form will most likely be a conventional multiplier. Such a circuit will have load resistors and a current source to operate it. If this current source is slaved to sources 41 and 47 and the resistors made in the same way as resistors 42 and 48, it will be a simple matter of current ratioing to make sure that the output of detector 13 matches the window created in the sample and hold circuit as a function of ambient and processing variables.

The invention has been described in terms of a carrier current system. However, a person skilled in the art will recognize that it applies in many other types of data transmission systems. The invention will be useful in any system in which an offset in a differential signal is to be eliminated. Accordingly, it is intended that the scope of the invention be limited only by the following claims.

We claim:

1. In a data transmission system receiver, having a data output comparator driven from a source of data signal, circuit means for sensing and correcting data signal offset comprising:

a storage capacitor;

amplifier means having an input coupled to said source of data signal and a signal window with upper and lower portions and a size substantially equal to said data signal, said amplifier means comprising first and second differential input transconductance amplifiers having oppositely poled input offset potentials with the combined offset values made substantially equal to the peak-to-peak value of said data signal and oppositely poled diodes respectively coupling said first and second differential input transconductance amplifier outputs to said capacitor whereby the charge on said capacitor is varied as a function of said data signal offset;

means for developing a current that is related to said charge on said capacitor; and means for coupling said current to said source of data signal whereby said signal offset is corrected.

2. The circuit of claim 1 wherein said first and second differential transconductance amplifiers each comprise a pair of differentially connected transistors operated from matched constant tail current sources and each includes a resistor coupled in series with one transistor emitter thereby to create an offset.

3. The circuit of claim 2 wherein each of said first and second differential transconductance amplifiers includes a current mirror load coupled to the collectors of said pair of differentially connected transistors to create a single ended output that can be diode coupled to said capacitor.

4. The circuit of claim 2 wherein the tail currents in said first and second differential transconductance amplifiers are slaved to a current supply feeding said signal detector and said resistor is constructed of the same material as the load resistors in said signal detector whereby said window tracks said signal over normally encountered thermal ambients and processing variations.

* * * * *